UNITED STATES PATENT OFFICE.

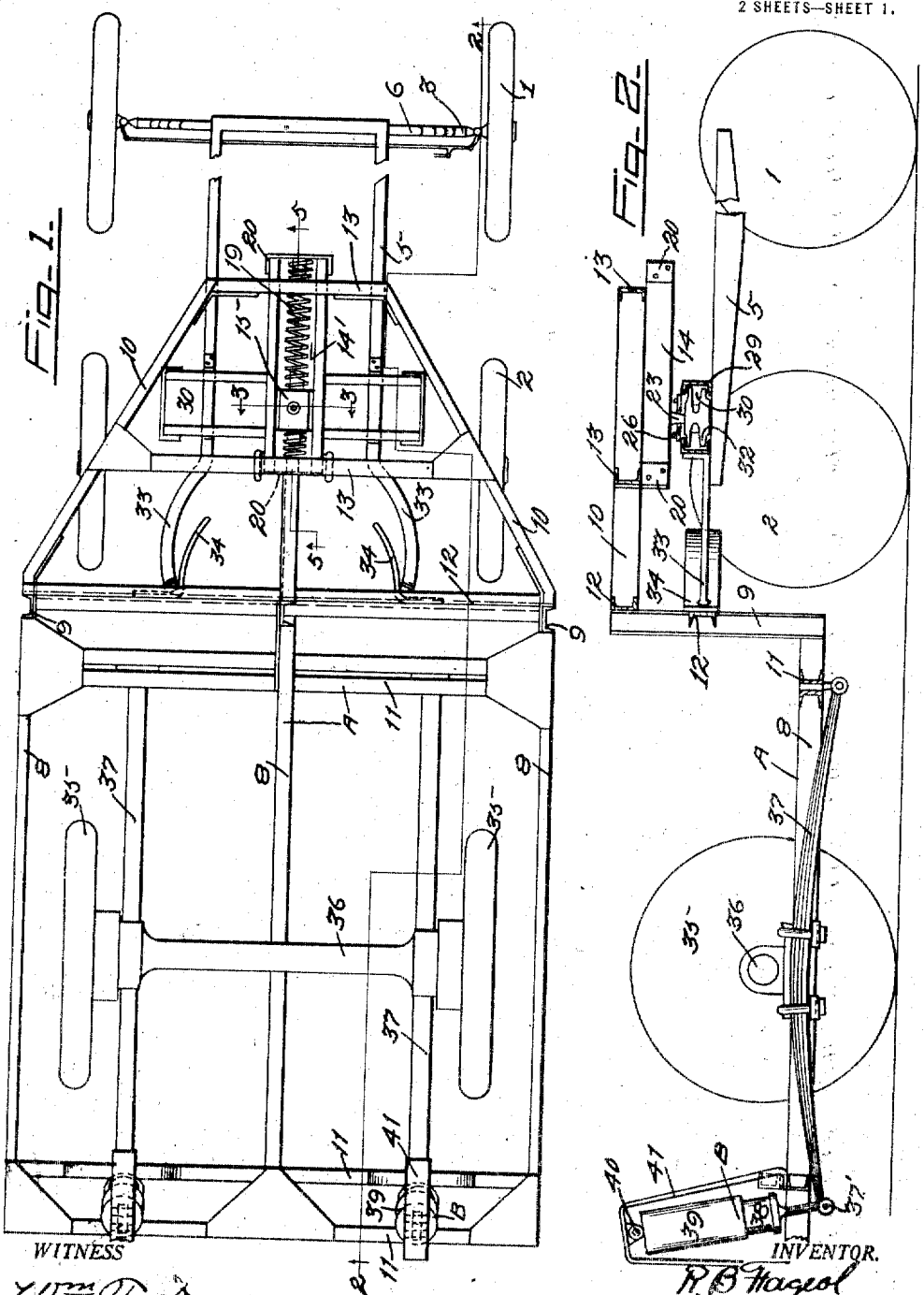

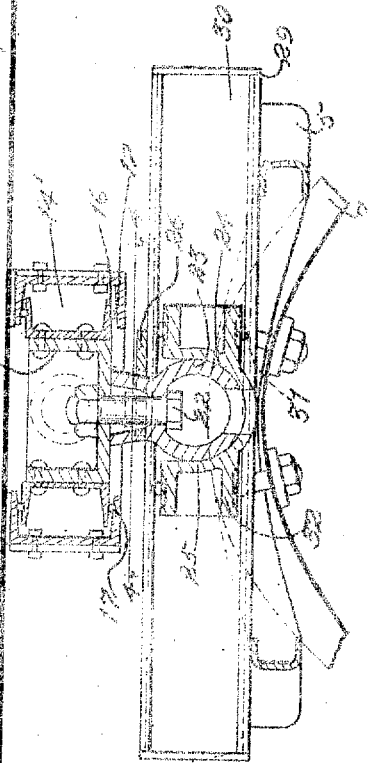

ROLLIE B. FAGEOL, OF OAKLAND, CALIFORNIA.

INTERSTEERING CONNECTION FOR FLEXIBLE VEHICLES.

1,226,961.      Specification of Letters Patent.      Patented May 22, 1917.

Application filed May 3, 1916. Serial No. 95,132.

*To all whom it may concern:*

Be it known that I, ROLLIE B. FAGEOL, a citizen of the United States, residing at Oakland, in the county of Alameda and State of California, have invented certain new and useful Improvements in Intersteering Connection for Flexible Vehicles, of which the following is a specification.

The present invention relates to improvements in drawbar construction, and particularly to a type of structure adapted for employment in connection with flexible vehicles, consisting of a motor member and a trailer supported by and overhanging the rear of the same and wherein it is desired to position the frame thereof in close proximity to the road surface, and yet maintain the two members closely coupled.

The invention has for its principal objects to provide a drawbar construction by the employment of which vehicles may be closely coupled and when turning will be sufficiently separated to prevent the interfering of the rear wheels of the motor member with the body or frame of the trailer member; to provide a construction which will enable the single pair of supporting wheels of the trailer member to track in the path of the wheels of the motor member, when either traveling in a straight line or when the vehicle is turning; to provide a drawbar construction which will permit of a transverse movement of the forward or overhanging portion of the trailer member relatively to the rear of the motor member.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, disclosing the preferred embodiment thereof and wherein—

Figure 1 is a view in plan of a flexible vehicle, disclosing the motor and trailer members and illustrating the connection between the same.

Fig. 2 is a sectional view taken on line 2—2 of Fig. 1.

Fig. 3 is a sectional view taken on line 3—3 of Fig. 1.

Fig. 4 is a detail sectional view taken on line 4—4 of Fig. 3.

Fig. 5 is a sectional view taken on line 5—5 of Fig. 1.

Referring more particularly to the several views of the drawings, wherein like characters of reference designate corresponding parts, 1 and 2 indicate respectively the front and rear supporting wheels for the motor member carried by suitable axles 3 which support the frame 5 carried by the front and rear springs 6 and 7. A is the trailer frame consisting of the main frame members 8 disposed close to the road surface, the upright members 9 which extend upwardly at right angles from the forward ends of the members 8, and the converging members 10 which extend at right angles from the upper ends of the members 9 and overlie the rear of the frame of the motor member, as in Figs. 1 and 2. Transverse channels 11 connect the main frame members 8, and members 9 are connected by channels 12. The frame members 10 which overlie the rear of the motor member frame are connected by the channels 13 which carry the parallel spaced oppositely disposed channels 14 providing a guide 14′. A suitable block or member 15 is mounted in the guide 14′ formed by channels 14, and the same carries the outwardly disposed channels 16 which project into the channels 14, bearings 17 being mounted between the channels to insure an easy movement of the block. Suitable springs 18 and 19 mounted in the guide 14′ provide a cushioning means in advance and in rear of the block, the outer ends of the springs abutting against the end plates 20, forming the ends of the guide 14′ and are received over the members 21 which support the same.

To the underside of the block 15 is secured by the bolt 22 the ball head 23 which is received in the socket 24 formed in a coöperating sliding member or block 25. The head 23 is prevented from accidental withdrawal from the socket by the curved keeper plate 26 pivotally mounted at one end, as at 27, and held in locked position at its opposite end to block 25 by the nut 28.

The coöperating sliding member or block 25 is mounted to slide transversely of the frame of the motor member in a guide 30 formed between the channels 29 mounted thereon and which are parallel spaced and oppositely disposed relative to each other. Bearings 31 between the flanges 32 of the block 25 and the channels 29 permit of an easy sliding movement of the block in the guide 30. Tractor levers 33 project rearwardly from the frame of the motor members, as in Figs 1 and 2, and extend preferably a slight distance beyond the rear supporting wheels 2. The ends of the levers 33 coöperate with the shoes or guides 34 extending forwardly from the member 12 and which are curved toward each other.

The trailer is carried by a single pair of supporting wheels 35 which are carried on the axle 36, the axle being supported by springs 37 secured at the forward end to the transverse member 11 and pivotally connected at their rear ends, as at 37′, to the lower end of the member 38 of a shock absorber B. The shock absorbers are of any well known construction and the upper portions 39 thereof coöperating with the member 38 are pivotally connected as at 40 with the brackets 41 carried by the rear members 11.

When the vehicle is traveling straight ahead the action of the spring 18′ on the block 15 is such as to maintain the trailer member closely coupled to the motor member with the ends of the tractor levers 33 in contact with the member 12 at the base of the shoes or guides 34. When a turn is made with the motor member, the end of the lever 33 on the inner circumference of the turn will, owing to its swing, bear heavily against the surface of the shoe 34, coöperating therewith, and depending on the abruptness of the turn separate the vehicle members in accordance therewith, and compress the front spring 19 in so doing, permitting the wheel 2 on the inner circumference of the turn to clear the frame of the trailer members as it cuts under the overhanging portion of the same. The action of the lever on the inner circumference of the turn against its coöperating shoe, is such as to force the forward overhanging end of the trailer member transversely of the motor member, to position the supporting wheels 35 thereof at the proper angle relatively to the wheels of the motor member, to insure the tracking thereof with the wheels of the motor member. In the turning of the motor member the end of the lever at the outer circumference of the turn, owing to the separation of the two vehicle members, moves over its coöperating shoe in slight spaced relation thereto.

I have provided a connection which will enable two vehicle members to be closely coupled and which will permit an automatic separation thereof when turning to prevent the interfering of the rear wheels of the motor member with the body or frame of the trailer. I have also provided a connection which permits of the tracking of the wheels of the trailer with the wheels of the motor member when the vehicle is rounding a corner and have provided a yielding connection between the motor and trailer members.

Having thus described my invention what I claim as new and desire to protect by Letters Patent is:—

1. A vehicle comprising a motor member having steering and supporting wheels and a trailer member having a single pair of supporting wheels adjacent one end thereof, the other end projecting over the motor member, means for connecting said vehicle members including a guide extending transversely of the motor member, a pivotal connection carried by the trailer member and coöperating with said guide, and coöperating devices carried by the motor and trailer members for causing a transverse movement of the forward end of the trailer member over the motor member when said vehicle members are traveling in a curved path.

2. A vehicle comprising a motor member having steering and supporting wheels and a trailer member having a single pair of supporting wheels adjacent one end thereof, the other end projecting over the motor member, means for connecting said vehicle members and permitting transverse and longitudinal movement of the overlapping portions of the two vehicle members, and coöperating devices carried by the motor and trailer members for causing a transverse and longitudinal movement of the overlapping portions of the two vehicle members when said vehicle members are traveling in a curved path.

3. A vehicle comprising a motor member having steering and supporting wheels and a trailer member having a single pair of supporting wheels adjacent one end thereof the other end projecting over the motor member, a guide carried by each of said overlapping portions of the two vehicle members, said guides arranged at substantially right angles to each other, a block slidably mounted in each of said guides, a pivotal connection between said blocks, spring tension means coöperating with one of said blocks, and coöperating devices carried by the motor and trailer members for causing a transverse and longitudinal movement of the overlapping portions of the two vehicle members when the same are traveling in a curved path.

4. A vehicle comprising a motor member having steering and supporting wheels and a trailer member having a single pair of supporting wheels adjacent one end thereof and the other end projecting over the motor member, a pivoted connection between the overlapping portions of the two vehicle members, said connection permitting of a transverse and longitudinal movement of the overlapping portions of the two vehicle members, a pair of traction levers carried by the motor member, a pair of shoes carried by the trailer member and with which said levers coöperate for causing a transverse and longitudinal movement of the overlapping portions of the two vehicle members when the same are traveling in a curved path, and spring tension means for drawing said motor and trailer members together.

5. A vehicle comprising a motor member having steering and supporting wheels and a trailer member having a single pair of supporting wheels adjacent one end thereof the other end projecting over the motor member, a guide carried by each of said overlapping portions of the two vehicle members, said guides arranged at substantially right angles to each other, a block slidably mounted in each of said guides, a pivotal connection between said blocks, spring tension means coöperating with one of said blocks, coöperating devices carried by the motor and trailer members for causing a transverse and longitudinal movement of the overlapping portions of the two vehicle members when the same are traveling in a curved path, and spring tension means for drawing said motor and trailer members together.

6. A vehicle comprising a motor member having steering and supporting wheels, and a trailer member having a single pair of supporting wheels adjacent one end thereof, the other end projecting over the motor member, means for connecting said vehicle members and permitting transverse and longitudinal movement of the overlapping portions of the two vehicle members, and means for causing a transverse and longitudinal movement of the overlapping portions of the two vehicle members, when said vehicle members are traveling in a curved path.

7. A vehicle comprising a motor member having steering and supporting wheels, and a trailer member having a single pair of supporting wheels adjacent one end thereof, the other end projecting over the motor member, means for pivotally connecting said vehicle members, means for drawing said trailer member toward said motor member when traveling in a straight path, and means for forcing said vehicles from each other when traveling in a curved path.

8. In a vehicle comprising a motor member having steering and supporting wheels, and a trailer member having a single pair of supporting wheels adjacent one end thereof, the other end projecting over the motor member, a movable means for pivotally connecting said vehicle member, and means for shifting the pivotal connection when the vehicle members are traveling in a curved path.

In testimony whereof I have signed my name to this specification in the presence of the subscribing witness.

ROLLIE B. FAGEOL.

Witness:
D. B. RICHARDS.